ated June 13, 1967

3,325,436
BACTERIA-RESISTANT LATICES CONTAINING
α-α'-AZOBIS(CHLOROFORMAMIDINE)
Hershel B. Prindle, Ralph R. Langner, and Thomas H. Chandler, Lake Jackson, Tex., assignors to The Dow Chemical Company, Midland, Mich., a corporation of Delaware
No Drawing. Filed Apr. 1, 1963, Ser. No. 269,734
6 Claims. (Cl. 260—29.7)

This invention relates to bacteria-resistant latexes. More specifically, it relates to latexes containing α,α'-azobis(chloroformamidine) and at least one other bactericide which latexes are more resistant to bacteria than latexes containing either α,α-azobis(chloroformamidine) or other bactericides alone.

Many compounds have been tried as preservatives for latexes and many of these compounds have proven to be effective to some degree. For example, one such compound, formaldehyde, proved to be an excellent preservative but had the major disadvantage of disappearing from the latex system, to which it had been added, in from two to three weeks and the system thus contained no bactericide. Nitropropanediol was initially very effective, but, as is the general case, bacteria quickly built up an immunity to it. The organo mercurial compounds suffered the same fate as the nitropropanediol. Thus, a real problem is ever present in the latex art and besides the requirements of being a bactericide, the preservative compound must not have any detrimental effects on the latex formulations. That is, in latex formulations to which a bactericide is added, the bactericide must not degrade the properties of heat, light, mechanical and salt stabilities of the latexes.

In the copending application for United States Letters Patent, Ser. No. 269,742, filed Apr. 1, 1963, by Prindle et al., titled, "Bacteria-Resistant Latexes," it is taught that α,α'-azobis(chloroformamidine), hereinafter called azochloramid, is good as a bactericide in latexes and that, further, it functions in the surprisingly low range of from 10 to about 100 parts per million (p.p.m.). While the azochloramid does function as related, it does have the disadvantage disclosed therein that much below about 30 p.p.m. azochloramid, the bactericidal effect is not permanent and there is a tendency of the latex to yellow with increasing amounts of azochloramid.

It is an object of the present invention to provide bacteria-resistant latexes.

Another object is to provide bacteria-resistant latexes which contain very little bactericide and thereby eliminate any tendency of discoloration in the latexes.

Another object is to provide latexes which contain azochloramid and at least one other bactericide.

And still another object is to provide latexes which are highly resistant to bacteria and which still retain excellent heat, light, mechanical and salt stability. Other objects will appear hereinafter.

These objects are accomplished by preparing latexes containing azochloramid and at least one other bactericide such that the total amount of bactericides in the latex is in the range of from 10 to about 550 p.p.m. Within the combined total amount of bactericides (i.e., azochloramid, plus at least one other bactericide), the amount of azochloramid will vary in the range of from about 5 to about 50 p.p.m. and the amount of other bactericide will vary within the range of from about 5 to about 500 p.p.m. This is more clearly shown in the following manner:

$A_{5-50\ p.p.m.} + B_{5-500\ p.p.m.} = 10\text{-}550$ total p.p.m., wherein
$A$ = Azochloramid and can vary from 5 to 50 p.p.m.
$B$ = Bactericide and can vary from 5 to 500 p.p.m. If more than one bactericide, other than azochloramid, is used, the total p.p.m. can vary from 5 to 500 p.p.m.
$A + B$ total p.p.m. can be in the range of from 10 to 550 p.p.m.
Example: 10 p.p.m. $A$ + 20 p.p.m. $B$ = 30 p.p.m. total in latex.
Example: 10 p.p.m. $A$ + (10 p.p.m. $B$ + 5 p.p.m. B') = 25 p.p.m. total in latex, wherein B' is a bactericide different from B.

The preferred amount of azochloramid will be in the range of 10 to 20 p.p.m. and the preferred total amount of bactericide will be in the range of from 10 to 150 p.p.m. If the amount of azochloramid much exceeds about 30 p.p.m., there is a tendency for the latex to yellow. However, this is not detrimental if the latex is going to be colored, i.e., black, blue, etc., and generally as high as 100 p.p.m. can be tolerated for colored latexes.

By the expression "at least one other bactericide" as used herein, it is meant at least one other compound, such as the organo mercurials, e.g., phenyl mercuric acetate, di(phenylmercuric) ammonium propionate, sodium ethyl mercuri thiosalicylate and the like. Other suitable bactericides include formaldehyde; nitropropanediol, 2,4-dichloro 6-(0-chloroanilino)-S-triazine; dehydroacetic acid, sodium dehydroacetate, etc.; bis(tri-n-butyltin)oxide; p-sulfondichloraminobenzoic acid, obtained as "Halazone"; p-toluenesulfonamide; high molecular weight alkyl dimethylbenzyl ammonium chlorides, obtained as "Zephiran chloride"; mixtures of n-alkyl dimethylbenzyl ammonium chlorides with n-alkyl dimethyl ethylbenzyl ammonium chlorides, obtained as "BTC–50%," "BTC–2125" and "BTC–1100"; lauryl isoquinolinium bromide, obtained as "Isothan Q–75"; quaternary salt of hexamethylene tetramine and 1,3-dichloropropene; and the like.

It is believed that there exists a cooperative action between certain of these bactericides and azochloramid such that the total bactericidal effect is greater than the sum of the bactericidal effects taken independently. For example, while 10 p.p.m. azochloramid functions for a period of time to render a latex bacteria-resistant, it does eventually fail and 10 p.p.m. of an organo mercurial compound, as stated above, also fails. However, when 10 p.p.m. (total 20 p.p.m.) of these two compounds are incorporated into a latex formulation, the formulation becomes bacteria-resistant and all desirable properties of the latex remain unaffected.

It is surprising that azochloramid, which can be represented by the formula:

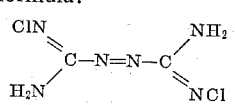

is stable enough in the formulations of the present invention to permit its use. Most compounds of this class in solution; even when protected from light, are relatively unstable. Representative compounds exhibiting this instability include dichlorourea, N-chloroacetanilide, and the N-chlorophenylguanidines whose hydrolysis reaction has a tendency to proceed with explosive violence. Further, ochloramid is the only compound of this class which actions within the scope of the present invention.

It is known to the art that pH is an important factor in ex formulations and herein consideration must be given reto. Latexes of the present invention containing azoloramid and at least one other bactericide are preferly formulated such that the pH is in the range of from out 7.0 to about 8.8. However, satisfactory formulans have been achieved with the pH as high as 10. Those illed in the latex art will recognize the above pH range being the range wherein bacteria usually grow since ong acid formulations and likewise strong basic forulations retard growth.

A further indication of the extraordinary stability of e azochloramid in the latexes of the present invention shown by the fact that latexes having a pH in the prerred range containing azochloramid and at least one her bactericide therein retain their bacteria-resistance en after heating at 60° C. for 60 hours. However, it ust be understood that if the bactericide employed along ith the azochloramid evaporates or is otherwise deroyed, such as by high temperature degradation, its pplemental effectiveness will be destroyed. For exnple, sodium ethyl mercuri thiosalicylate, nitropropaneol, and azochloramid have been found to cooperate tother with excellent results in this manner. If the pH is ised to greater than 8.8, i.e., up to about 10, higher temeratures and longer time periods may be used on the acteria-resistant latex formulations without destroying e bactericidal effect.

Azochloramid can be prepared by the careful chlorinaon of azodicarbonamidine (i.e.,

r hydrazodicarbonamidine salts (i.e.,

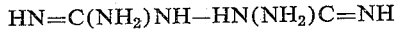

alts) with hypochlorites or chlorine gas.

The organic, polymeric materials can be prepared by mploying known methods for emulsion polymerizing the 1onomers. The monomer, in emulsion, can be polymer:ed by the aid of heat and/or light in the presence or bsence of polymerization catalyst at subatmospheric, at1ospheric or superatmospheric pressure. Instead of using 1onomeric material, it is possible to start with partially olymerized materials or with a monomer mixture and ther partially polymerized monomeric materials. Another method of producing these polymeric latex materials is to mix the monomer mixture with a polymer and ring about the further polymerization of the entire mass y the application of heat and/or light in the presence or bsence of polymerization catalyst at subatmospheric, atnospheric or superatmospheric pressure. However, the rganic polymers of the present invention are best preared by employing emulsion methods for polymerizing he monomer mixture.

The organic copolymers of the bacteria-resistant latexes of the invention may be obtained from polymerizable lefinic compounds, such as (I) $C_1$–$C_{18}$ primary and secondary alkyl esters of acrylic acid including methyl acryate, ethyl acrylate, propyl- and isopropyl acrylates, butyl-, isobutyl- and sec.-butyl acrylates, amyl- and iso1myl acrylates, hexyl acrylate, 2-ethylhexyl acrylate, octy acrylate, 3,5,5-trimethylhexyl acrylate, decyl acrylate, dodecyl acrylate, cetyl acrylate, otcadecyl acrylate, octadecenyl acrylate; (II) $C_1$–$C_{18}$ primary and secondary alkyl esters of methacrylic acid, such as methyl-, ethyl-, propyl-, isopropyl, butyl-, isobutyl- and sec.-butyl methacrylates, n-amyl methacrylate, sec.-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate; (III) monoethylenically unsaturated monocarboxylic acids, such as acrylic acid, methacrylic acid and the like; (IV) monoethylenically unsaturated dicarboxylic acids, such as maleic acid, fumaric acid, crotonic acid, itaconic acid, etc.; (V) monoethylenically unsaturated nitriles, such as acrylonitrile, methacrylonitrile, etc.; (VI) various monoalkenyl aromatic hydrocarbons of the benzene series characterized by the general formula:

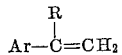

wherein Ar, selected independently, represents an aromatic hydrocarbon and a nuclear halohydrocarbon radical and R is selected from the group consisting of hydrogen, a $C_1$–$C_4$ alkyl radical, and a halogen radical having an atomic number of from 17 to 35. Suitable monomers of the group immediately above include styrene, α-methylstyrene, o-methylstyrene, p-methylstyrene, m-methylstyrene, ar-ethylstyrene, propylstyrenes, butylstyrenes, ar-chlorostyrene, ar-bromostyrene and the like. Other suitabl monomers are (VII) open-chain conjugated dienes containing from 4 to 9 carbon atoms, such as butadiene, isoprene and the like, as well as (VIII) vinyl chloride; and (IX) vinylidene chloride.

In further illustration of latexes which can be made bacteria-resistant by the presence therein of a suitable amount of admixtures of azochloramid with at least one other bactericide, there are those latexes known to the art and which are generally classified as (A) acrylic latexes and (B) styrene-butadiene latexes. Specific examples of acrylic latexes which benefiit appreciably by this invention include (1) a terpolymer latex composed of about 60 weight percent of copolymerized butyl acrylate, about 37 weight percent of copolymerized acrylonitrile, and about 4 weight percent of copolymerized methacrylic acid; (2) a copolymer latex composed of about 71 weight percent of copolymerized ethyl acrylate and about 29 weight percent of copolymerized methyl methacrylate; (3) a quaternary copolymer latex composed of about 50 weight percent of copolymerized styrene, about 40 weight percent of copolymerized 2-ethylhexyl acrylate, about 7.0 weight percent of copolymerized acrylonitrile, and about 3.0 weight percent of copolymerized acrylic acid; and particularly (4) a ternary copolymer composed of about 67 weight percent of copolymerized ethyl acrylate, and about 33 weight percent of methyl methacrylate; and (5) a quaternary copolymer latex composed of about 55.7 weight percent of copolymerized ethyl acrylate, about 33.8 weight percent of copolymerized methyl methacrylate, about 5.7 weight percent of copolymerized butyl acrylate, and about 4.8 weight percent of copolymerized methacrylic acid. Particular examples of sytrene-butadiene latexes include (1) a copolymer latex composed of about 67 weight percent of copolymerized styrene and about 33 weight percent of copolymerized butadiene, and (2) a quaternary copolymer latex composed of about 53 weight percent of copolymerized styrene, about 43 weight percent of copolymerized butadiene-1,3, about 3 weight percent of copolymerized fumaric accid and about 1 weight percent of copolymerized acrylic acid.

In addition to the specific organic, polymeric latexes set forth above, various stable, compatible mixtures of the above polymeric latexes may likewise benefit by having present therein the effective bactericidal mixtures of azochloramid and bactericide of the present invention.

Since certain changes may be made in the above polymerizable monomeric components, and since different embodiments of the invention could be made without departing from the scope thereof, it is intended that all matter contained in the above description shall be interpreted as illustrative only and not in a limiting sense. Thus, the term "monomer" implies a single monomer or a mixture of two or more monomers and the term "polymer" implies a homopolymer or a copolymer of two or more monomers.

An emulsifier is generally employed in emulsion polymerization practices preferably in an amount in the range of from about 0.01 to about 10.0 percent based on monomer weight and may be of the anionic, cationic or nonionic type. While it is desirable to have an anionic emulsifier, it is not detrimental if a small amount, i.e., up to 10 percent, of a nonionic emulsifier is present or added after polymerization is complete. Appropriate emulsifying agents for present purposes include aryl sulfonates, alkali metal alkyl sulfates, alkyl naphthalene sulfonate, n-octadecyldisodium sulfosuccinate, di-t-butylphenoxy(poly-ethylene oxide)$_{40}$, sodium octylphenoxy(polyethylene oxide) sulfonate, isooctylphenyl polyethoxyethanol, nonylphenyl ether of nonaethylene glycol, sodium capryl phosphate, nonylphenyl ether of tetracontaethylene glycol, alkylphenyl polyethylene glycol ether, dioctyl sodium sulfosuccinate, and the like, etc. When greater than about 10 to 15 percent of the emulsifier is employed, there is usually no proportional increase in benefits and the resulting latex may have such a propensity to form as to detract from its utility as a coating composition. The optimum amount of emulsifier and specific type can easily be determined by someone familiar with the field. When less than about 0.1 percent is employed, the stability of the latex, its utility as a coating type polymeric composition, and other properties suffer adversely.

Suitable catalysts are the peroxides, e.g., benzoyl peroxide, phthaloyl peroxide, naphthoyl peroxide, substituted benzoyl peroxides, acetyl peroxide, caproyl peroxide, lauroyl peroxide, cinnamoyl peroxide, acetyl benzoyl peroxide, sodium peroxide, hydrogen peroxide, di-tert.-butyl peroxide, tert.-butyl hydroperoxide, tetralin peroxide, 1-hydroxy cyclohexyl hydroperoxide-1, urea peroxide, etc., the percompounds, e.g., ammonium persulfate, sodium perchlorate, sodium perborate, potassium persulfate, etc., ozone, ozonides, etc., Lewis-acid type catalysts, e.g., aluminum chloride, stannic chloride, etc., metal compounds of unsaturated acids such, for instance, as cobalt and manganese salts of linoleic acid, maleic acid, etc. Benzoyl peroxide is the preferred catalyst. The catalysts may be used alone or in admixture with one another. Any suitable amount of the catalyst or catalyst mixture may be used, but, in general, the catalyst concentration that gives satisfactory results may be within the range of 0.1 to 0.4 percent by weight of the entire polymerizable mass.

The action of the catalysts may be enhanced by the use of suitable promoters or activators. A catalyst-promoter system can enable the polymerization to proceed at room temperature and bring about the polymerization of the entire mass in a much shorter time. A number of nitrogeneous compounds, e.g., amines, especially aromatic and aliphatic tertiary amines, azo compounds, etc.; aromatic sulfinic acids, certain sulfites like dibutyl sulfite, etc.; long chain aliphatic mercaptans, e.g., dodecyl mercaptan, etc., are capable of promoting the action of catalysts like peroxides, percompounds like persulfates, etc. and bring about the polymerization at room temperature. The time required for such a polymerization will depend on the nature and amounts of the catalyst and promoter employed. In polymerizations of this type, it may be desirable to employ polymer or copolymer along with the monomer mixture. Polymerization conditions may further be modified by the application of heat, light or heat and light, cooling at atmospheric, subatmospheric and superatmospheric pressure.

The range of polymerization temperatures to be employed in accordance with the four different polymerization techniques practiced herein to insure the production of a satisfactory copolymer product in each instance is governed as to upper limit by the temperature at which the polymer depolymerization rate commences to exceed the polymer formation or polymerization rate. A satisfactory lower temperature limit is determined by ascertaining the polymerization initiation and polymerization propagation temperatures required by the various monomer or monomers being polymerized.

In accordance with the practice for preparing the bacteria-resistant, organic, polymeric latexes of the present invention, a bactericidal solution is prepared, said solution being comprised of from about 10 to about 55 p.p.m. of an admixture of α,α′-azobis(chloroformamidine) and at least one other bactericide wherein the amount of α,α′-azobis(chloroformamidine) present from about 5 to 50, and preferably of from 10 to 25 p.p.m., and wherein the sum total of the amount of at least one other bactericide present is from about 5 to 500 and preferably of from 10 to 100 p.p.m., said bactericidal solution being incorporated into an aqueous dispersion containing from about 20 to about 75, and preferably from about 45 to 55, weight percent of non-volatile polymer solids of at least one polymerized latex composed essentially of polymerizable ethylenically unsaturated monomers selected from the group consisting of (I) $C_1$–$C_{18}$ primary and secondary alkyl esters of acrylic acid; (II) $C_1$–$C_{18}$ primary and secondary alkyl esters of methacrylic acid; (III) monoethylenically unsaturated monocarboxylic acids; (IV) monoethylenically unsaturated dicarboxylic acids; (V) monoethylenically unsaturated nitriles; (VI) various monoalkenyl aromatic hydrocarbons of the benzene series characterized by the general formula:

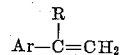

wherein Ar, selected independently, represents an aromatic hydrocarbon and a nuclear halohydrocarbon radical and R is selected from the group consisting of hydrogen, a $C_1$–$C_4$ alkyl radical, and a halogen radical having an atomic number of from 17 to 35; (VII) open-chain conjugated dienes containing from 4 to 9 carbon atoms; (VIII) vinyl chloride; and (IX) vinylidene chloride.

The following examples are merely illustrative of practices suitable for preparing and evaluating the aqueous dispersions of organic, polymeric latexes into which, in turn, are incorporated the novel and effective bactericidal compounds for these latexes, namely, α,α′-azobis(chloroformamidine) with other generally less effective bactericides. Accordingly, these illustrative examples are not to be construed as limiting to the scope of the present invention.

*Example I*

A latex was prepared by maintaining a reaction vessel, containing 110 parts water, 10 parts emulsifier, and 0.5 part potassium persulfate and equipped with a means for stirring and temperature control, at 90° C. To this solution was added dropwise over a one-hour time period, a mixture comprising 67 parts of ethyl acrylate and 33 parts of methyl methacrylate. This represents a typical, known to the art, latex preparation.

A sample of the above latex was contaminated with bacteria, the mixture was stirred for one minute, and then allowed to stand for 48 hours. This standing for 48 hours is referred to as incubation time. Streaks of the above incubated latex were placed on an agar plate for 48 hours and this is referred to as plate incubation time. At the end of plate incubation time, the bacteria colonies were counted and the streaks were rated from 1 to 10 with the streaks having no colonies being rated 1. A latex control sample, i.e., containing no bactericide, had so many colonies at the end of plate incubation time that they were beyond counting and the rating was given as 10. This procedure for testing and evaluating the bactericidal activity of various bactericides in the presence of azochloramid was followed for the above-described latex and the other latexes of the present invention. The bactericidal compounds, when used singly or in combination, were added to the pseudomonos fluorescens bacteria contaminated latex dispersions in aqueous solutions. Results d specifics of the tests of the copolymer latex of this ample are shown hereinafter in Table I:

TABLE I

| Bactericide | Times, Inc.[1] | Rating |
|---|---|---|
| ).p.m. A [2] | 1 | 10 |
| ).p.m. C | 7 | 10 |
| ).p.m. A+10 p.p.m. C | 21 | 10 |
| ).p.m. A+500 p.p.m. B | 1 | 10 |
| p.p.m. A+500 p.p.m. B+10 p.p.m. C | 5 | 1 |
| p.p.m. B [3] | 1 | 10 |
| p.p.m. C [4] | 11 | 10 |
| p.p.m. A | 7 | 10 |

Times, Inc.=number of times each sample was inoculated with contaminated latex.
A=sodium ethylmercuri thiosalicylate.
B=nitropropanediol.
C=a,a'-azobis(chloroformamidine).

*Example II*

Employing procedures corresponding to those of Example I, a sample of a styrene-butadiene quaternary copolymer latex containing about 48 weight percent of non-volatile polymer solids composed of about 53 weight percent of copolymerized styrene, about 43 weight percent of copolymerized butadiene-1,3, about 3 weight percent of copolymerized fumaric acid and about 1 weight percent of copolymerized acrylic acid was contaminated with the bacteria, *pseudomonos fluorescens*.

Thereafter, the effectivness of various bactericidal compounds on curbing the growth of the bacteria in the above-mentioned latex was tested and evaluated in accordance with the procedure also explained in Example I. Particulars with regard to the number of times each latex sample was inoculated with bacteria contaminated latex, bactericides used both singly and in combination, and the rating results obtained are shown hereinafter in Table II:

TABLE II

| Bactericide | Times, Inc. | Rating |
|---|---|---|
|  | 1 | 10 |
| 0 p.p.m. C [1] | 1 | 10 |
| 0 p.p.m. C | 1 | 10 |
| 0 p.p.m. C | 3 | 4 |
| 00 p.p.m. D [2] | 4 | 3 |
| 0 p.p.m. C+100 p.p.m. D | 5 | 1 |

[1] C=α,α'-azobis(chloroformamidine).
[2] D=quaternary salt of hexamethylene tetramine and 1,3-dichloropropene.

As many possible embodiments can be made of this invention without departing from the scope thereof, it is to be understood that all matter herein set forth is to be interpreted as illustrative and not as unduly limiting the invention.

What is claimed is:

1. A bacteria-resistant, water-insoluble, organic, polymeric latex composition comprised of (A) an aqueous dispersion of at least one monoethylenically unsaturated copolymer having from about 20 to about 75 weight percent of non-volatile polymer solids of polymerizable monoethylenically unsaturated monomers selected from the group consisting of (I) $C_1$–$C_{18}$ primary and secondary alkyl esters of acrylic acid; (II) $C_1$–$C_{18}$ primary and secondary alkyl esters of methacrylic acid; (III) monoethylenically unsaturated nitriles; (IV) monoalkenyl aromatic hydrocarbons of the benzene series represented by the general formula:

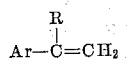

wherein Ar, selected independently, represents an aromatic hydrocarbon radical and a nuclear halohydrocarbon radical and R is selected from the group of substituents consisting of hydrogen, a $C_1$–$C_4$ alkyl radical, and a halogen radical having an atomic number of from 17 to 35 inclusively; (V) open-chain aliphatic conjugated dienes having from 4 to 9 carbon atoms inclusively; (VI) vinyl chloride; (VII) vinylidene chloride; (VIII) monoethylenically unsaturated monocarboxylic acids; and (IX) monoethylenically unsaturated dicarboxylic acids and (B) from about 10 to about 550 parts per million of a bactericidal mixture of at least two bactericides composed essentially of from about 5 to about 50 parts per million of α,α'-azobis(chloroformamidine) and correspondingly from about 5 to about 500 parts per million of at least one other bactericide selected from the group consisting of sodium ethyl mercuri thiosalicylate, and the quaternary salt of hexamethylene tetramine and 1,3-dichloropropene.

2. A bacteria-resistant, water-insoluble, organic polymeric latex composition comprised of (A) an aqueous dispersion of copolymer latex having from about 45 to 55 weight percent of non-volatile polymer solids composed essentially of about 67 weight percent of copolymerized ethyl acrylate and about 33 weight percent of copolymerized methyl methacrylate, the total combined weight of copolymer latex solids being equal to 100 weight percent and (B) from about 10 to about 550 parts per million of a bactericidal mixture of at least two bactericides composed essentially of from about 5 to about 50 parts per million of α,α'-azobis(chloroformamidine) and correspondingly from about 5 to about 500 parts per million of at least one other bactericide selected from the group consisting of sodium ethyl mercuri thiosalicylate and the quaternary salt of hexamethylene tetramine and 1,3-dichloropropene.

3. The bacteria-resistant latex of claim 2, wherein said α,α'-azobis(chloroformamidine) is present in said bactericidal mixture in from about 10 to about 20 parts per million and correspondingly, sodium ethyl mercuri thiosalicylate is present in said bactericidal mixture in about 10 parts per million.

4. The bacteria-resistant latex of claim 2, wherein said α,α'-azobis(chloroformamidine) is present in said bactericidal mixture in about 10 parts per million, sodium ethyl mercuri thiosalicylate is present in said bactericidal mixture in about 10 parts per million and nitropropanediol is present in said bactericidal mixture in about 500 parts per million.

5. A bacteria-resistant, water-insoluble, organic, polymeric latex composition comprised of (A) an aqueous dispersion of quaternary copolymer latex having from about 45 to 55 weight percent of non-volatile polymer solids composed essentially of about 53 weight percent of copolymerized styrene, about 43 weight percent of copolymerized butadiene-1,3, about 3 weight percent of copolymerized fumaric acid and about 1 weight percent of copolymerized acrylic acid, the total combined weight of copolymer latex solids being equal to 100 weight percent and (B) from about 10 to about 550 parts per million of a bactericidal mixture of at least two bactericides composed essentially of from about 5 to about 50 parts per million of α,α'-azobis(chloroformamidine) and correspondingly from about 5 to about 500 parts per million of at least one other bactericide selected from the group consisting of sodium ethyl mercuri thiosalicylate, and the quaternary salt of hexamethylene tetramine and 1,3-dichloropropene.

6. The bacteria-resistant latex of claim 5, wherein said α,α'-azobis(chloroformamidine) is present in said bactericidal mixture in about 10 parts per million and the quaternary salt of hexamethylene tetramine and 1,3-dichloropropene is present in said bactericidal mixture in about 100 parts per million.

(References on following page)

References Cited

UNITED STATES PATENTS

| | | | |
|---|---|---|---|
| 1,958,370 | 5/1934 | Schmelkes | 167—22 |
| 2,019,121 | 10/1935 | Rewal | 167—22 |
| 2,547,822 | 4/1951 | Johnson et al. | 167—22 |
| 2,724,707 | 11/1955 | Brown | 260—29.7 |
| 2,795,564 | 6/1957 | Conn et al. | 167—42 |
| 2,873,263 | 2/1959 | Lal | 167— |
| 2,888,421 | 5/1959 | Adams et al. | 167— |
| 2,986,492 | 5/1961 | Cannon | 167— |

MURRAY TILLMAN, *Primary Examiner.*

J. ZIEGLER, J. T. GOOLKASIAN, *Assistant Examiner*